(12) United States Patent
Gourdol

(10) Patent No.: US 6,721,455 B1
(45) Date of Patent: Apr. 13, 2004

(54) METHOD AND APPARATUS FOR ICON COMPRESSION AND DECOMPRESSION

(75) Inventor: Arnaud Gourdol, Sunnyvale, CA (US)

(73) Assignee: Apple Computer, Inc., Cupertino, CA (US)

( * ) Notice: Subject to any disclaimer, the term of this patent is extended or adjusted under 35 U.S.C. 154(b) by 919 days.

(21) Appl. No.: 09/074,545

(22) Filed: May 8, 1998

(51) Int. Cl.[7] .............................. G06K 9/36; G06K 9/32
(52) U.S. Cl. ...................................... 382/232; 382/298
(58) Field of Search ................................ 382/232, 166, 382/162, 243, 245, 244, 299, 298, 234; 707/104; 358/403, 261.1

(56) References Cited

U.S. PATENT DOCUMENTS

| | | | |
|---|---|---|---|
| 5,047,853 A | 9/1991 | Hoffert et al. | 375/240.01 |
| 5,212,742 A | * 5/1993 | Normile et al. | 382/166 |
| 5,327,254 A | 7/1994 | Daher | 382/298 |
| 5,357,546 A | * 10/1994 | Meriwether et al. | 358/261.1 |
| 5,500,923 A | * 3/1996 | Kuroshima et al. | 358/1.15 |
| 5,553,277 A | * 9/1996 | Hirano et al. | 707/104 |
| 5,764,807 A | * 6/1998 | Pearlman et al. | 382/240 |

OTHER PUBLICATIONS

Murray et al., Encyclopedia of Graphics File Format, second edition, O'Reilly & Associates, Sebastopol, CA, 1996, p. 164.*

* cited by examiner

Primary Examiner—Wenpeng Chen
(74) Attorney, Agent, or Firm—Burns, Doane, Swecker & Mathis, LLP

(57) ABSTRACT

A method and apparatus for compressing and decompressing small amounts of image data, such as icon image data, is disclosed. The image data is transformed from RGB color space data to luminance and chrominance data. The chrominance data is then reduced by means of a thinning or averaging process. Run length encoding is performed on the luminance data and reduced chrominance data to compress for storage. The invention allows accurate and efficient storage and use of a small amount of compressed image data, particularly for continuous tone icons.

42 Claims, 4 Drawing Sheets

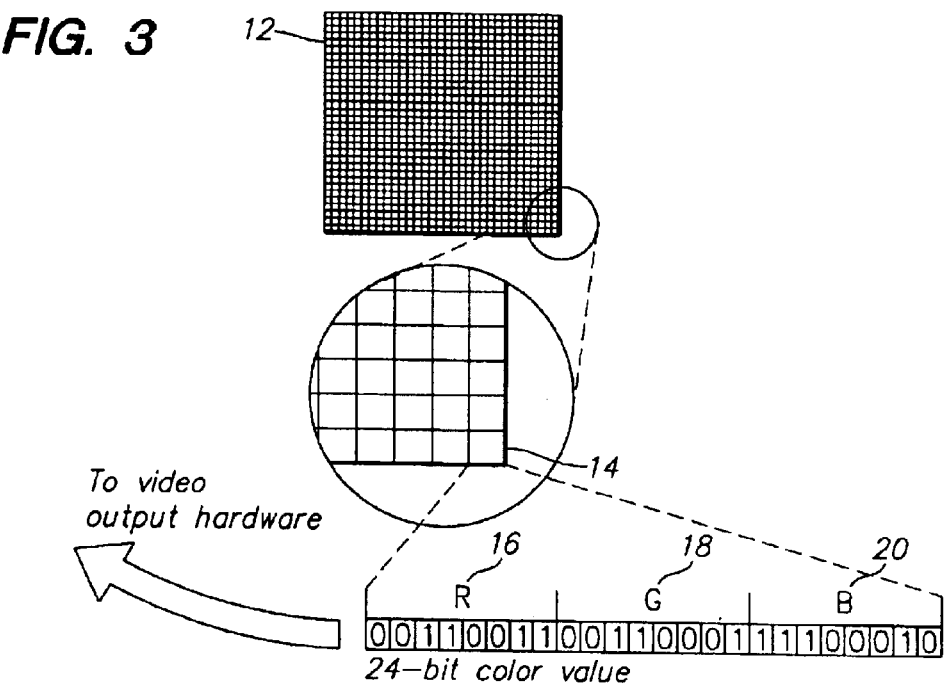

FIG. 3

To video output hardware 24-bit color value

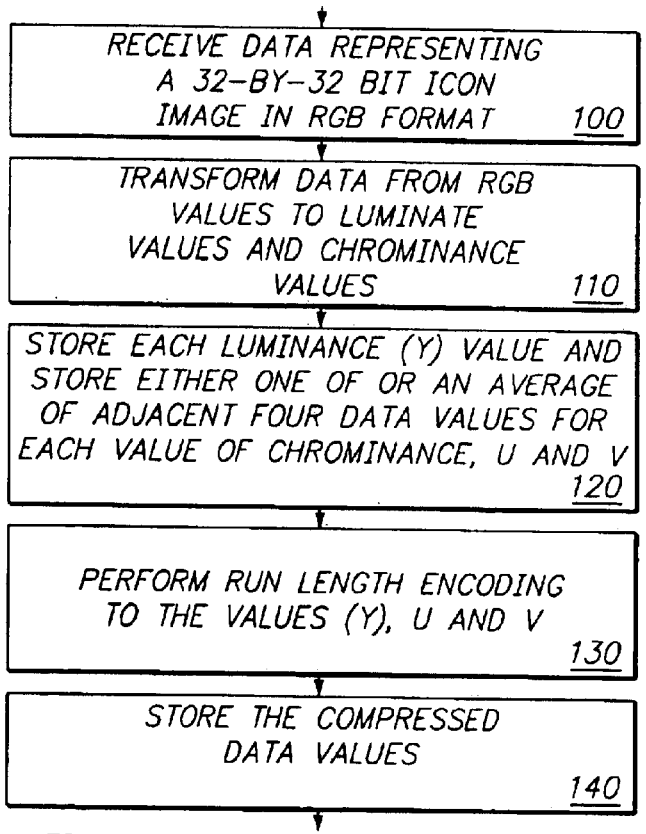

RECEIVE DATA REPRESENTING A 32-BY-32 BIT ICON IMAGE IN RGB FORMAT  100

TRANSFORM DATA FROM RGB VALUES TO LUMINATE VALUES AND CHROMINANCE VALUES  110

STORE EACH LUMINANCE (Y) VALUE AND STORE EITHER ONE OF OR AN AVERAGE OF ADJACENT FOUR DATA VALUES FOR EACH VALUE OF CHROMINANCE, U AND V  120

PERFORM RUN LENGTH ENCODING TO THE VALUES (Y), U AND V  130

STORE THE COMPRESSED DATA VALUES  140

FIG. 4

METHOD AND APPARATUS FOR ICON COMPRESSION AND DECOMPRESSION

BACKGROUND OF THE INVENTION

1. Field of the Invention

The present invention relates generally to compression and decompression of small amounts of digitized image data used to represent, for example, an icon image. One implementation of the invention relates to compressing and decompressing an icon image having a color depth of 32 bits while retaining an accurate representation of the image.

2. Description of the Related Art

Digitized image data that is used in printers and scanners and displayed on monitors, for example, is typically quantized on a pixel-by-pixel basis and stored in available memory as a pixel map of image data. The pixel map is a two dimensional array of picture elements mapped to locations of the digitized image. In order to provide sufficient color range and fidelity, each pixel is typically stored in memory as a set of color coordinates which define a pixel's color location in a given color space. For example, a pixel is typically represented by red, green and blue color component values (RGB values).

Due to the increased volume of data required to represent color images, much effort has been directed to the compression of data located in the color bitmaps. A compression technique in common use was developed by the Joint Photographic Experts Group (JPEG). JPEG is an international standards group which has developed a standard for the compression of continuous tone images. Compression using JPEG techniques can require the following: (1) a transformation from spacial information into frequency information via a discrete cosine transform, (2) a quantization routine which maps data to a compressed quantization matrix, and (3) compression of the quantized information by one of many data compression techniques.

However, data compression utilizing JPEG techniques cannot be efficiently applied to smaller images (e.g., smaller amounts of data) because it introduces error into the system and significantly reduces the space saving benefits normally associated with data compression. First, the JPEG quantization routine results in a loss of data due to the performance of rounding. Furthermore, known data compression techniques, such as those used in JPEG systems, are not able to efficiently compress smaller amounts of data. Most compression techniques are normally applied to large images of at least 256-by-256 pixels. These conventional compression techniques require fixed-size dictionaries which store required codes used during data compression/decompression. When fixed size dictionaries are used in large image compression tasks, the memory space utilized by the dictionaries is negligible compared to the amount of space saved. Unfortunately, utilizing these routines with smaller images (i.e., an icon image within a 32×32 pixel area) does not significantly reduce the amount of data stored because of the size of the dictionary required to perform the compression.

As such, there is a need for a data compression routine that is able to compress small amounts of image data without having to use a fixed size dictionary. Furthermore, there is a need for the data compression routine to increase the efficiency with which data is compressed.

SUMMARY OF THE INVENTION

The present invention is directed to a method and associated apparatus for compressing a small amount of image data while, at the same time, improving compression ratio and reducing the effects of lost data associated with data compression. In accordance with exemplary embodiments, such features are achieved through the use of a data compression algorithm which transforms image data from RGB color space to luminance and chrominance data values and also performs a run length encoding of transformed data streams.

More particularly, exemplary embodiments of the present invention transform RGB pixel data of an icon to a stream of luminance values and two individual streams indicating the chrominance of the image. The transformation to luminance values is performed to ensure that the luminance values, which provide brightness data vital to human perception, are not lost during data compression. Each luminance value is stored, and either a selected value out of four adjacent chrominance values or an average value of four adjacent chrominance values (for each stream) is stored. The transformation of the data provides a reduction in data of approximately 50%, relative to the amount of original RGB color space data, while retaining all luminance values. Once the luminance and chrominance values have been stored, run length encoding is applied to each data stream.

Exemplary embodiments of the present invention compress the luminance and chrominance values via run length encoding. The encoding algorithm determines if there are repetitions within each data stream. If data values are repeated, an operation code (opcode) related to the number of repetitions is generated and placed in the compressed data stream immediately before a repeated data value. If the data values are not repeated, an opcode is generated to indicate that the values following the opcode are not repeated. The opcode eliminates the repetition of redundant data values and therefore reduces the amount of data stored in memory.

By compressing icon images in accordance with exemplary embodiments of the present invention, improved data compression is realized without the need for a large fixed data dictionary, which would otherwise reduce the effects of the compression. Furthermore, in transforming from RGB values to luminance values, exemplary embodiments of the present invention achieve an improved mapping range.

Generally speaking, exemplary embodiments relate to a method and apparatus for processing data relating to an image by: receiving image data in RGB color space format; transforming RGB color space data values to luminance and chrominance data values; reducing the number of chrominance values by an averaging technique; encoding the transformed values to compress the image data; and storing the compressed data in a memory.

BRIEF DESCRIPTION OF THE DRAWINGS

Other objects and advantages of the present invention will become more apparent from the following detailed description of the invention when read in conjunction with the accompanying drawings wherein like elements are designated by like numerals and wherein:

FIG. 3 illustrates a 32-by-32 bit icon image in an RGB color space format representing the image data for each pixel;

FIG. 4 illustrates a flow chart of the data compression technique in accordance with an exemplary embodiment of the present invention;

DETAILED DESCRIPTION OF THE INVENTION

The present invention will be described hereinafter with reference to the accompanying drawings in which the data associated with graphical icons that are used within a user interface is compressed. However, this invention is not limited to only to the compression of graphical icon data. Rather, graphical icon data compression is meant to be exemplary of other elements that contain relatively small data amounts, e.g. images less than 256×256 pixels in size.

Figure 1:
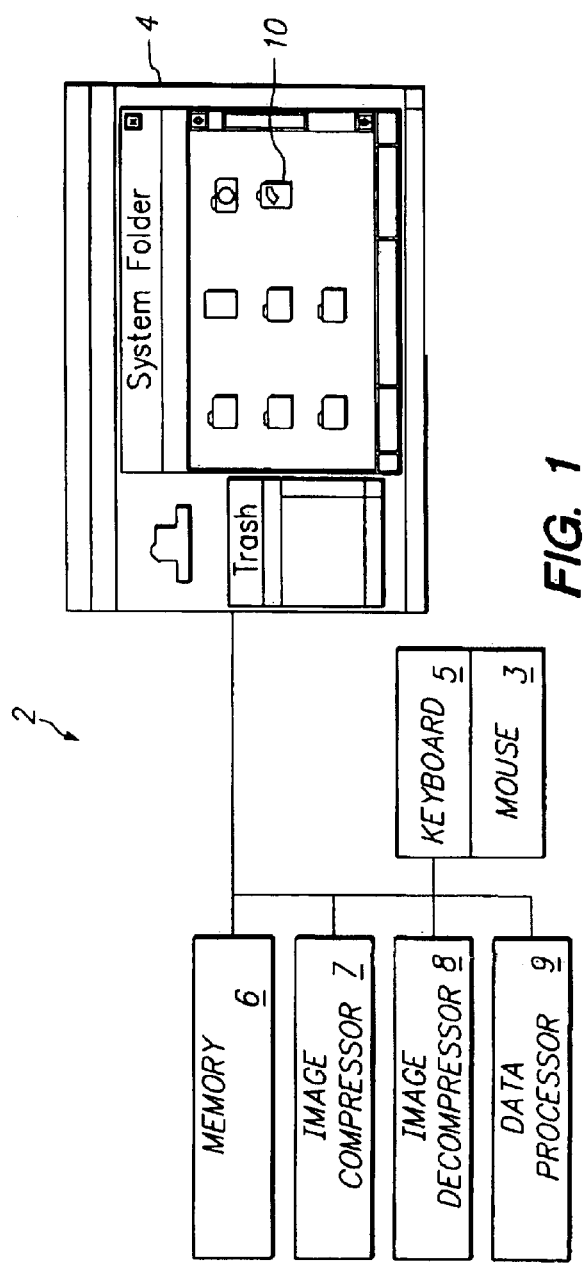
FIG. 1 illustrates a computer system utilized in accordance with an exemplary embodiment of the present invention.

Referring to FIG. 1, a general computer system 2 of a type in which the present invention can be implemented, is illustrated. Computer system 2 comprises a display device 4 and various input devices such as a keyboard 5 and a mouse 3 in operable connection with a memory 6, image compressor 7, image decompressor 8 and a data processor 9. While other elements and components are normally connected to the computer, only these elements are shown so as not to obscure the invention. The computer system 2 is able to run many different applications and programs such as a word processing program, an accounting program and e-mail programs, to name a few. With the development of graphical user interface (GUI) systems, these programs and applications have been made to be more readily accessible in a user-friendly manner. In a known manner, these interfaces use icons 10 to represent disks, documents and other computer applications. A user is able, through the use of a mouse 3 or a keyboard 5, for example, to access a program or application by simply clicking on the icon which is displayed on the computer display and which represents a specific program.

Figure 2:
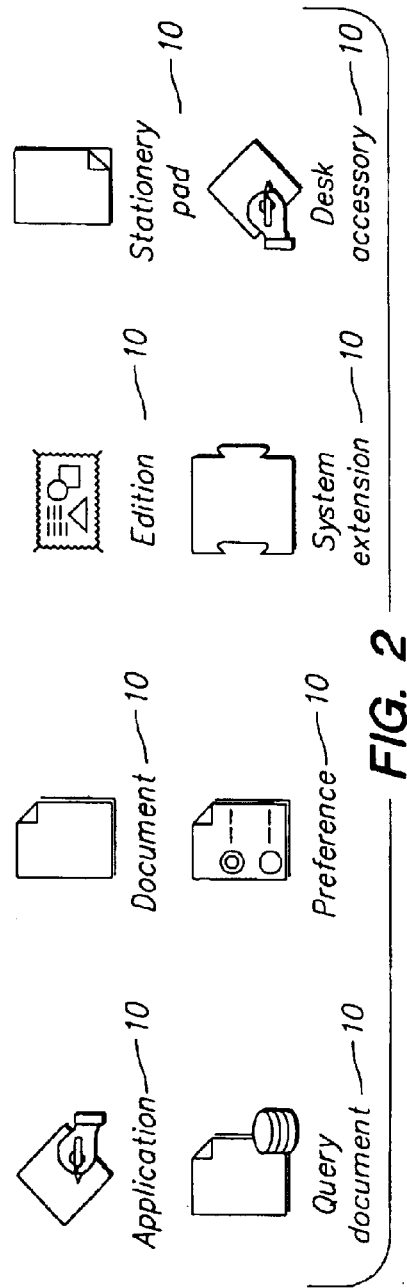
FIG. 2 illustrates exemplary icon images utilized in accordance with an exemplary embodiment of the present invention.

FIG. 2 illustrates exemplary icon images that are used in display devices of computer systems. Graphical icons 10 are shown which represent, an application program, a document file, an edition, stationary pad, a query document, a preference item, an operating system extension and a desk accessory program.

The icons form part of the graphical user interface, which is a component of the computer's operating system. In a preferred embodiment of the invention, the image compressor 7 and decompressor 8 are implemented as software modules which are also contained within the user interface portion of the operating system. These software components are stored in a suitable computer readable medium, such as the memory 6.

As illustrated in FIG. 3, an icon 10 is stored in memory as a 32-by-32 array of pixel data 12. Conventional icon image storage utilized an eight bit word, i.e., one byte, to represent each pixel's color. The eight bits yield 256 different colors for every pixel, and require 1 KB of memory to store the data for an icon. As the functionality and appearance of graphical user interfaces continue to grow, it is desirable to be able to use more than the 256 colors provided by eight-bit data, to provide richer texture. For instance, exemplary embodiments of the present invention illustrated in FIG. 3 show a direct 32-bit color system in which each pixel 14 (shown as an individual square) is represented by four bytes of data. Each pixel contains data values for a red color component (R) 16, a green color component (G) 18, and a blue color component (B) 20. Also, an alpha channel (not illustrated) is selected which can carry auxiliary data such as transparency masks. Each color component (red, green or blue) can represent any one of 256 colors or levels, so that the combination of these components yield millions of available colors to be used, to effectively provide continuous tone color.

The image data is normally stored in the memory 6 and can be accessed when an individual icon is required to be displayed on the display device 4 of the computer system 2. The RGB and alpha channel data is output to video output hardware (not illustrated). In a 32-bit implementation, 4 kilobytes of memory is generally required for each icon 10. Hence, if many icons are needed for the user interface, a large area of memory would have to be used to store this data.

Exemplary embodiments of the present invention reduce the amount of icon data while still maintaining a high quality icon image through the use of an icon compression algorithm, as generally illustrated in the flow diagram of FIG. 4. It is well established that humans perceive changes in brightness more acutely than changes in color. For example, humans are known to generally detect different shades of gray more acutely than shades of red, green or blue. To utilize this phenomenon to its fullest extent, a transformation from RGB values into luminance data values is performed to allow for a more careful compression of the data that takes into account human perceptions.

In step 100 of FIG. 4, the 32-by-32 pixel icon image data 12 is received by the compressor 7 in a data stream. A transformation from a pixel value represented by RGB data to values of luminance (Y) and two values which represent chrominance, U and V, is performed in step 110. As discussed above, the reason for transformation to YUV values is that it separates the more highly perceived luminance component, Y, from less critical chrominance data components U and V. Luminance, (Y), is now separately quantified where the untransformed data, in RGB color space, did not distinguish luminance from other color attributes.

In step 120, once the transformation of data from RGB color space to luminance color space is completed, the chrominance values, U and V, are separately compressed. For instance, one of every four adjacent chrominance values may be selected and stored. In an alternative exemplary embodiment, a block of four adjacent chrominance values can be averaged and the resulting average stored in memory. Since chrominance is not as vital to human perception and hence, the icon image, data can be reduced via value selection or averaging (e.g., a 4:1 reduction of data) while still maintaining a fairly accurate image.

Figure 5:
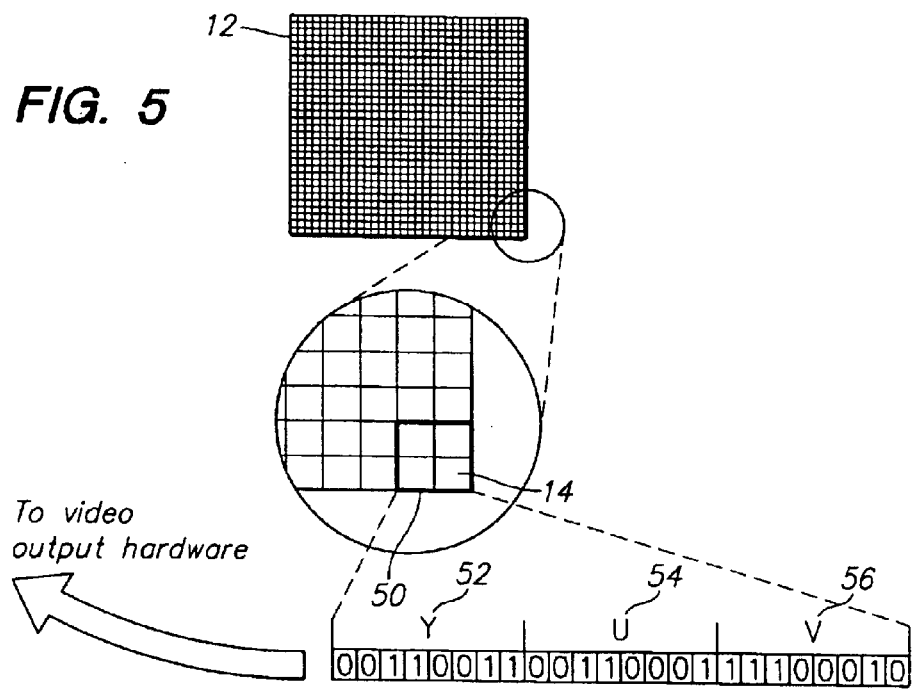
FIG. 5 illustrates a 32-by-32 bit icon image with luminance data values representing the image data for each pixel in accordance with the present invention.

FIG. 5 illustrates the image data values (luminance value Y 52 and the chrominance values U 54 and V 56) once the transformation has taken place. As can be seen from the illustration, the transformation to luminance values is performed on a 32-by-32 icon data matrix. A box 50 represents the adjacent pixel values that can be used to perform the averaging calculation to produce the chrominance values that are stored with the luminance values. As a result of the averaging or the data selection, there are 1024 bytes of luminance values (Y), and 256 bytes for each chrominance value, U and V. Through this transformation and compression there is a 50 percent reduction in data, in comparison to RGB data, while still maintaining accurate image values. While in the present embodiment an averaging of every four pixels is described, it may also be feasible to perform the averaging over more values (if less chrominance accuracy is required) or a lesser number of pixels (if more chrominance accuracy is required).

Typically, RGB color data is expressed in a range of 0–255, and normal transformation from RGB color space to luminance color space results in a smaller range of chrominance data values (over a range of approximately 0 to 213). In one aspect of the present invention, a linear expansion technique is applied so that the number of data values again covers the range of 0–255. As a result of performing this expansion technique, less data loss occurs and a more accurate transformation to luminance color space is achieved.

In accordance with another aspect of the present invention, the transformation technique takes into account the change in computer and video displays that has occurred over time. Previously, the transformation from RGB color format to luminance values involved the following known equations that were determined on the basis of characteristics of early color television sets:

$$Y = 0.299R + 0.587G + 0.114B \quad (1)$$

$$U = 0.1687R - 0.3313G + 0.5B + 128 \quad (2)$$

$$V = 0.5R - 0.4187G - 0.0813B + 128 \quad (3)$$

However, different phosphors are utilized in current computer and video screens from those that were used as the standard for the above equations. In a preferred implementation of the invention, the following equations are used for the transformation from RGB to YUV, to account for the characteristics of modern display equipment:

| (1) | Y = 0.433956R + 0.376218G + 0.189827B |
| (2) | U = 0.212671R + 0.715160G + 0.072169B |
| (3) | V = 0.017758R + 0.109476G + 0.872766B |

Figure 6:
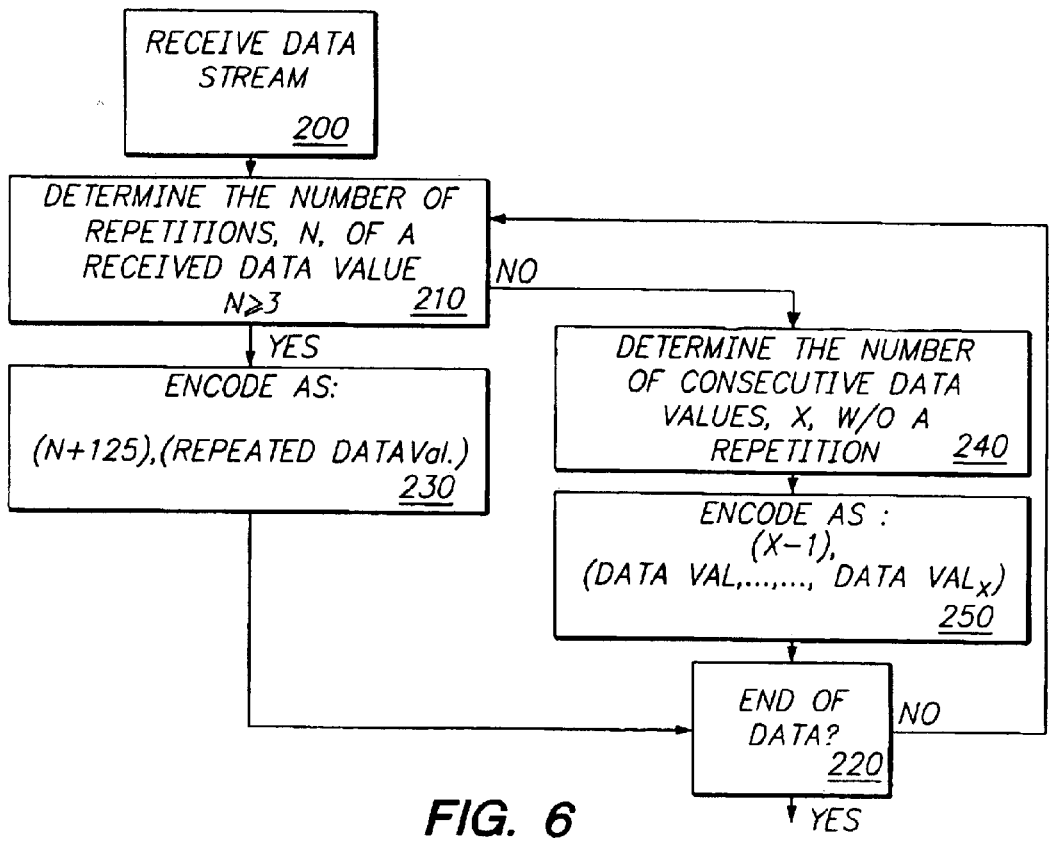
FIG. 6 illustrates a flow chart of the run length encoding algorithm utilized in accordance with an exemplary embodiment of the present invention.

Once the image data is stored after transformation to luminance color space, and averaging of the chrominance values has taken place, run length encoding is performed on the image data, as shown in step 130 of FIG. 4. Once the data is further compressed by means of such encoding, it is stored in memory 6 as illustrated in step 140. A more detailed description of the run length encoding is illustrated in the flow chart of FIG. 6.

As shown in step 200, data streams for each transformed value (luminance and the each chrominance) is received by the image compressor 7. The data streams can correspond to a raster scan of the icon image. Thus, the luminance data stream can comprise the luminance value for each pixel in the first row of the image, from left to right, followed by each pixel value for the second row, and so on. The data streams for the selected or averaged chrominance values are constructed in a similar manner. Each stream of data is encoded separately. Opcodes are utilized in run length encoding to reduce the amount of data. Within this system an opcode value can range from 0 to 255. If the opcode has a value from 0 to 127, the values following the opcode are uncompressed values. If the opcode has a value from 128 to 255, the values following after the opcode are repeated values. More specifically, starting with the first data value, in step 210, the encoder determines if the first data value in the data stream is repeated (immediately after the first data value in question). If the data value is not repeated, the compressor 7 determines the number of consecutive data values, X, that do not repeat and places the opcode, V, which represents X−1 into the compressed data stream, as illustrated in steps 240 and 250 of FIG. 6. The compressor 7 places all of the data values which are not repeated in a data train following the opcode, and compressor 7 continues to process the data in this manner until a repetition of a data value is found or the end of the data stream (step 220) has been encountered.

If, on the other hand, the compressor 7 determines that there is a repetition of a data value in question, the number of repetitions, N, are counted. If a data value only repeats once, it is treated in the manner described above, i.e. the successive data values simply follow the appropriate opcode. If, however, the same data values appear three or more times in succession in the data stream, they are compressed into a single value. An opcode, V, which represents the value N+125 is placed into the compressed data stream followed by the individual data value which has been repeated, as shown in step 230. This indicates that at this point in the original data stream there are V−125 repetitions of the data value following the opcode. Compression is performed until the end of an individual data stream is reached. This lossless data compression insures accuracy of the brightness of the icon 10 when required for display.

Figure 7:
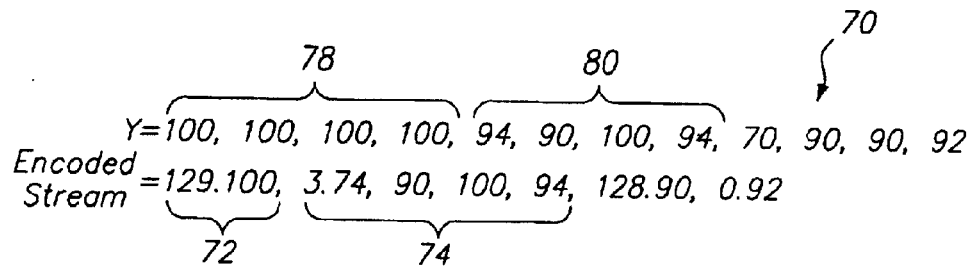
FIG. 7 illustrates an example of encoding a data stream utilizing the run length encoding scheme in accordance with an exemplary embodiment of the present invention.

An example of the run length encoding algorithm discussed above is shown in FIG. 7. In this example, a data stream of luminance values (Y) 70 is shown in a non-compressed form. A run of four consecutive data values 78, equal to 100, is shown followed by four non-repeated data values 80. As shown at 72 in the encoded stream in FIG. 7, the number of repeated data values N are counted and the value N+125 is input as an opcode followed by the data value which is repeated. Furthermore, with respect to the set of numbers 80 following the repeated data values 78, the number x of such values is counted (in this case 4). The value X−1 is then used as the opcode, V, which precedes the data values 74. This encoding technique is performed for all data streams for the icon image.

Figure 8:
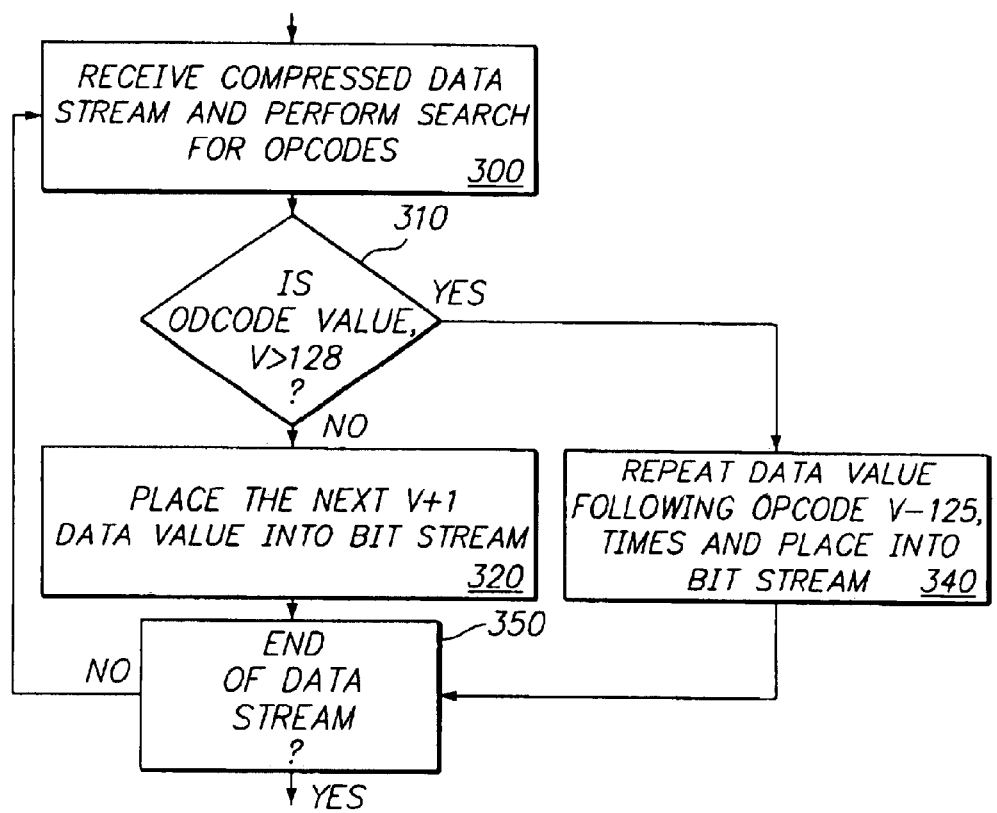
FIG. 8 illustrates a flow chart of a decoding algorithm based upon the run length encoding algorithm utilized in accordance with an exemplary embodiment of the present invention.

The compressed data is thereafter stored in memory 6 of the computer system 2. When the icon data is required for use (i.e., display or printing) the compressed data is retrieved from memory and sent to the image de-compressor 8. In order to decompress the icon image data, the image de-compressor 8 decodes the compressed data, as illustrated in FIG. 8. The image de-compressor 8 receives the compressed bit streams and searches for the opcodes inserted by the data compressor 7, as shown in step 300. Once the opcode value, V, is detected, the image decompressor determines whether it is less than a value of 128 as illustrated in step 310. If the opcode is greater than or equal to the value 128, the opcode indicates a repeated data value. Therefore, in accordance with step 340, the data value following the opcode is repeated V−125 times and output to a decompressed data stream. If, on the other hand, the opcode is less than 128, the value V+1 indicates the number of data values following the opcode that are not repeated and, therefore, have not been combined. As a result, these data values are not repeated, and are directly placed into the decompressed bit stream in accordance with step 320. Finally it is determined whether the data stream has ended in step 350. If the data stream has not ended, the next opcode is searched for in the data stream.

Once the image de-compressor 8 has received all data streams (i.e., luminance and both chrominance streams) and output a decompressed data stream, the luminance values can be transformed back into RGB color space utilizing the inverse of the manner in which the data was transformed. The data processor 9 then is able to display the icon image 10 on the display device 4 accurately while continuing to conserve memory space.

It will be appreciated by those of ordinary skill in the art that the present invention can be embodied in other specific forms without departing from the spirit or essential characteristics thereof. The presently disclosed embodiments are therefore considered in all respects to be illustrative and not restrictive. The scope of the invention is indicated by the appended claims rather than the foregoing description, and all changes that come within the meaning and range of equivalence thereof are intended to be embraced therein.

What is claimed is:

1. A method for compressing image data of a graphical icon, comprising the steps of:

receiving image data of a graphical icon having a size which is less than a 256×256 pixel array in a first format;

transforming said image data of said graphical icon from said first format to a luminance format comprising luminance and chrominance data values;

reducing the number of chrominance data values by a factor of N:1, where N>1;

run length encoding said luminance data values and said reduced chrominance data values to generate a compressed data stream; and storing said compressed data stream in a memory device.

2. The method for compressing image data of a graphical icon of claim 1, wherein said image data of said graphical icon is no larger than a 32-by-32 pixel array.

3. The method for compressing image data of a graphical icon of claim 1, wherein said reducing step calculates the average, for each chrominance value, of a block of N adjacent chrominance values.

4. The method for compressing image data of a graphical icon of claim 1, wherein said run length encoding comprises the steps of;

determining if there are any repetitions of individual data values in a data stream;

if a data value is immediately repeated in said data stream:
      generating a first type of opcode based on the number of repetitions of said data values; and
      placing said first type of opcode followed by said repeated data value in the compressed data stream, if a data value is not repeated in said data stream:
      determining the number of data values until another data value is repeated,
      using said resulting value to calculate a second type of opcode; and
      placing said second type of opcode followed by the non-repeated data values in the compressed data stream.

5. The method for compressing image data of a graphical icon of claim 1, wherein said transforming step is a byte-to-byte transformation.

6. An apparatus for processing image data, comprising:

transforming means for transforming RGB image data of a graphical icon which is less than a 256×256 pixel array to a luminance format which comprises luminance and chrominance data values;

reducing means for reducing the number of chrominance data values;

a run length encoder for compressing said luminance data values and said chrominance data values; and a memory device for storing said compressed data.

7. The apparatus for processing image data of claim 6, wherein said image data is no larger than a 32-by-32 pixel array.

8. The apparatus for compressing image data of claim 6, wherein said reducing means calculates the average, for each chrominance value, of a plurality of consecutive pixel chrominance values.

9. The apparatus for processing image data of claim 6, wherein said run length encoding means comprises:

determining means for determining if there are any repetitions of individual data values in a data stream, and;

if a data value is immediately repeated in said data stream:
      generating a first type of opcode based on the number of repetitions of said data values; and
      placing said first type of opcode followed by said repeated data value in a compressed data stream, and if a data value is not repeated in said data stream:
      determining the number of data values until another data value is repeated,
      using said resulting value to calculate a second type of opcode; and
      placing said second type of opcode followed by the non-repeated data values in the compressed data stream.

10. The apparatus for processing image data of claim 6, wherein said transforming means performs a byte-to-byte transformation.

11. The apparatus for processing image data of claim 6, further comprising;

decompression means for retrieving said compressed data from memory and generating a decompressed data stream.

12. An image data processor, comprising:

a processor for transforming RGB image data of a graphical icon which is less than a 256×256 pixel array to luminance format which comprises luminance and chrominance data values, and reducing the number of chrominance data values;

a run length encoder which compresses said luminance data values and said reduced chrominance data values; and a memory for storing said compressed data.

13. The image data processor of claim 12, wherein said image data is no larger than a 32-by-32 pixel array.

14. The image data processor of claim 12, wherein said processor calculates the average, for each chrominance value, of a plurality of consecutive pixel chrominance values.

15. The image data processor of claim 12, wherein said run length encoder comprises:

a processor for determining if there are any repetitions of individual data values in a data stream; and if a data value is immediately repeated in said data stream:
       generating a first type of opcode based on the number of repetitions of said data values; and
       placing said first type of opcode followed by said repeated data value in a compressed data stream, and if a data value is not repeated in said data stream:
       determining the number of data values until another data value is repeated,
       using said resulting value to calculate a second type of opcode; and placing said second type of opcode followed by the non-repeated data values in the compressed data stream.

16. The image data processor of claim 12, wherein said processor performs a byte-to-byte transformation.

17. The image data processor of claim 12, further comprising:
decompressor for retrieving said compressed data from memory and generating a decompressed data stream.

18. A computer-readable medium having stored therein an executable program which performs the steps of:
transforming image data of a graphical icon which is less than a 256×256 pixel array from a first format to a luminance format comprising luminance and chrominance data values;
reducing the number of chrominance data values by a factor of N:1, where N>1;
run length encoding said luminance data values and said reduced chrominance data values; and
storing said encoded data values in a memory device.

19. The computer-readable medium of claim 18, wherein said reducing step calculates the average, for each chrominance value, of a block of N adjacent chrominance values.

20. A method for compressing image data of a graphical icon, comprising the steps of:
receiving image data of a graphical icon which is no larger than a 32-by-32 pixel array in a first format;
transforming said image data of said graphical icon from said first format to a luminance format which comprises luminance and chrominance data values that conform to characteristics of a display device on which said graphical icon is to be imaged;
reducing the number of chrominance data values by a factor of N:1, where N>1;
compressing said luminance data values and said reduced chrominance data values; and
storing said compressed data in a memory device.

21. The method for compressing image data of a graphical icon of claim 20, wherein said compressing step comprises the steps of;
determining if there are any repetitions of individual data values in a data stream;
if a data value is immediately repeated in said data stream:
generating a first type of opcode based on the number of repetitions of said data values; and
placing said first type of opcode followed by said repeated data value in a compressed data stream,
if said data value is not repeated in said data stream:
determining the number of data values until another data value is repeated,
using said resulting value to calculate a second type of opcode; and
placing said second type of opcode followed by the non-repeated data values in the compressed data stream.

22. The method of claim 20, wherein said first format is an RGB color format.

23. The method of claim 22 wherein said step of transforming the image data to said luminance format is carried out according to the following formulas:

$$
\begin{aligned}
(1) \quad & Y = 0.433956R + 0.376218G + 0.189827B \\
(2) \quad & U = 0.212671R + 0.715160G + 0.072169B \\
(3) \quad & V = 0.017758R + 0.109476G + 0.872766B.
\end{aligned}
$$

24. The method of claim 22 wherein data values in said RGB color format cover a range of 0–255, and further including the step of linearly expanding the transformed chrominance data values to encompass a range of 0–255.

25. The method of claim 21 wherein each opcode comprises an integral number of bytes which cover a numerical range of 0 to M, and wherein one of said types of opcodes is designated by opcodes having a numerical value in the range of 0 to L, and the other type of opcode is designated by opcodes having a numerical value in the range of L+1 to M, where L<M.

26. The method of claim 25 wherein L is an integer value that is approximately equal to M/2.

27. The method of claim 25 wherein each opcode comprises one byte.

28. The method of claim 25 wherein the numerical value of said first type of opcode designates a number of repetitions of a data value which follows said opcode, and the numerical value of said second type of opcode designates a number of non-repeating data values which follow said opcode.

29. A computer-readable medium having stored therein an executable program which performs the steps of:
transforming image data which is less than a 256×256 pixel array from a first format to a luminance format wherein said luminance format has luminance and chrominance data values;
reducing the number of chrominance data values by a factor of N:1, where N>1;
compressing said luminance data values and said reduced chrominance data values by determining whether data values are repeated, and generating a stream of data values containing a first type of opcode comprising a byte of data having a numerical value in the range of 0 to L which designates a number of non-repeating data values that follow aid first type of opcode, and a second type of opcode comprising a byte of data having a numerical value in the range of L+1 to 255 which exceeds L by a value related to the number of times that a data value which follows said second type of opcode is to be repeated, wherein 0<L<255; and
storing said compressed data in a memory device.

30. The computer-readable medium of claim 29, wherein said reducing step calculates the average, for each chrominance value, of a block of N adjacent chrominance values.

31. A method for compressing image data of a graphical icon, comprising the steps of:
receiving image data of a graphical icon which is no larger than a 32-by-32 pixel array in a first format;
transforming said image data of said graphical icon from said first format to a luminance format comprising luminance and chrominance data values;
reducing the number of chrominance data values by a factor of N:1, where N>1;
run length encoding said luminance data values and said reduced chrominance data values by determining whether data values are repeated, and generating a stream of data values containing a first type of opcode comprising a byte of data having a numerical value in the range of 0 to L which designates a number of non-repeating data values that follow said first type of opcode, and a second type of opcode comprising a byte of data having a numerical value in the range of L+1 to 255 which exceeds L by a value related to the number of times that a data value which follows said second type of opcode is to be repeated, wherein 0<L<255; and storing said encoded data values in a memory device.

32. The method of claim 31, wherein said reducing step calculates the average, for each chrominance value, of a block of N adjacent chrominance values.

33. The method of claim 31 wherein said transformed luminance and chrominance data values conform to the characteristics of a display device on which said graphical icon is to be imaged.

34. The method of claim 33, wherein said first format is an RGB color format.

35. The method of claim 34 wherein said step of transforming the image data to said luminance format is carried out according to the following formulas:

| (1) | $Y = 0.433956R + 0.376218G + 0.189827B$ |
| (2) | $U = 0.212671R + 0.715160G + 0.072169B$ |
| (3) | $V = 0.017758R + 0.109476G + 0.872766B.$ |

36. The method of claim 34 wherein data values in said RGB color format cover a range of 0–255, and further including the step of linearly expanding the transformed chrominance data values to encompass a range of 0–255.

37. An image data processor, comprising:
a processor for transforming image data which is less than a 256×256 pixel array in a first format to a luminance format comprising luminance and chrominance data values, and reducing the number of chrominance data values;
a run length encoder which compresses said luminance data values and said reduced chrominance data values by determining whether data values are repeated, and generating a stream of data values containing a first type of opcode comprising a byte of data having a numerical value in the range of 0 to L which designates a number of non-repeating data values that follow said first type of opcode, and a second type of opcode comprising a byte of data having a numerical value in the range of L+1 to 255 which exceeds L by a value related to the number of times that a data value which follows said second type of opcode is to be repeated, wherein 0<L<255; and a memory for storing said compressed data.

38. The image data processor of claim 37, wherein said processor calculates the average, for each chrominance value, of a plurality of consecutive pixel chrominance values.

39. The image data processor of claim 37 wherein said transformed luminance and chrominance data values conform to the characteristics of a display device on which said graphical icon is to be imaged.

40. The image data processor of claim 39, wherein said first format is an RGB color format.

41. The image data processor of claim 40 wherein said step of transforming the image data to said luminance format is carried out according to the following formulas:

| (1) | $Y = 0.433956R + 0.376218G + 0.189827B$ |
| (2) | $U = 0.212671R + 0.715160G + 0.072169B$ |
| (3) | $V = 0.017758R + 0.109476G + 0.872766B.$ |

42. The image data processor of claim 40 wherein data values in said RGB color format cover a range of 0–255, and further including the step of linearly expanding the transformed chrominance data values to encompass a range of 0–255.

* * * * *